United States Patent [19]

Nakajima

[11] 4,141,742
[45] Feb. 27, 1979

[54] HIGH REFRACTIVE INDEX GLASS COMPOSITION

[75] Inventor: Nobuyuki Nakajima, Fukuoka, Japan

[73] Assignees: Fukuoka Tokushugarasu Kabushiki Kaisha; Seibu Polymer Kasei Kabushiki Kaisha, both of Japan

[21] Appl. No.: 911,318

[22] Filed: Jun. 1, 1978

[30] Foreign Application Priority Data

Jun. 7, 1977 [JP] Japan .................................. 52-66909

[51] Int. Cl.² .......................... C03C 3/12; C03C 3/30
[52] U.S. Cl. ................................................. 106/47 R
[58] Field of Search ............................... 106/47 R, 52

[56] References Cited

U.S. PATENT DOCUMENTS

| | | | |
|---|---|---|---|
| 2,842,446 | 7/1958 | Beck | 106/47 R |
| 2,939,797 | 6/1960 | Rindone | 106/47 R |
| 2,980,547 | 4/1961 | d'Adrian | 106/47 R |
| 3,198,641 | 8/1965 | Searight et al. | 106/47 R |
| 3,294,559 | 12/1966 | Searight et al. | 106/47 R |
| 3,468,681 | 9/1969 | Jaupain | 106/47 R |
| 3,493,403 | 2/1970 | Tung et al. | 106/47 R |

*Primary Examiner*—O. R. Vertiz
*Assistant Examiner*—Mark Bell
*Attorney, Agent, or Firm*—Robert E. Burns; Emmanuel J. Lobato; Bruce L. Adams

[57] ABSTRACT

Glass compositions having a refractive index of over 2.10 composed of the following metal oxides, in weight percent; 40.0 to 54.0% of $TiO_2$, 24.0 to 44.0% of BaO, 5.0 to 15.0% of ZnO, 3.0 to 13.0% of $ZrO_2$, 0.2 to 3.0% of CaO, 0.2 to 3.0% of MgO, 0.2 to 2.0% of $SiO_2$, 0.1 to 0.5% of $Na_2O$ and/or $K_2O$, and whose total weight exceeds 98.0% and moreover essentially without containing $B_2O_3$.

1 Claim, No Drawings

HIGH REFRACTIVE INDEX GLASS COMPOSITION

BACKGROUND OF THE INVENTION

This invention relates to new compositions for manufacturing glass with high refractive index of over 2.10, especially suited for producing glass beads to be used in reflex-reflective sheet for road traffic signs, vehicle number plates etc., and also can be used as glass flakes and fibers etc.

The glass for producing glass beads to be used for reflex-reflection, must be not only highly resistant to weathering, chemical actions etc., but the glass beads must be essentially clear and transparent without devitrification, and be very minute of less than 0.1 mm in diameter.

Heretofore, there have been various compositions suggested for this type of glass, but generally in order to obtain glass with high refractive index, it was considered that a high content ratio of $TiO_2$, PbO etc. would be effective.

For example, it is disclosed in U.S. Pat. No. 2,790,723 that refractive index of at least 2.10 can be obtained from $TiO_2$ - PbO system glass, but 10 to 65% content of PbO was an indispensable requirement for said composition.

However, the use of PbO as an ingredient in glass composition, not only produces a yellowish color to the glass, but also causes harmful effects to the workers, so the general opinion is to avoid the use of PbO and produce high refractive index glass by a composition that does not contain PbO.

Therefore, endeavors have been made to fulfil the initial aim of avoiding the use of PbO by increasing the $TiO_2$ content.

Namely, U.S. Pat. No. 2,726,161, U.S. Pat. No. 2,870,030 etc. have suggested $TiO_2$ - $Bi_2O_3$ system glass wherein all or part of the PbO is replaced by a high content of $Bi_2O_3$. Nevertheless, in the former example, 0 to 55% by weight of PbO content is required in its compositions, and since most of the example compositions shown contain PbO, the aforementioned problem has been left unsolved. Even in the latter patent, in which large amounts of $Bi_2O_3$ have been included, there are drawbacks due to the fact that high content of $Bi_2O_3$ causes yellow or brown coloring to glass and also the fact that the raw material for $Bi_2O_3$ is very expensive.

Accordingly, in order to obtain compositions for producing glass with refractive index of over 2.10, glass, such as disclosed in U.S. Pat. No. 3,493,403, of $TiO_2$ - RO system having a high content of over 55% by weight of $TiO_2$ and glass formed by the addition of other metal oxides to such system were suggested. It had been considered that the formation of such a glass was very difficult as the composition had a high fusion temperature and moreover the glass became readily devitrified. However the foregoing patents disclosed that even in the case of such a composition, it was possible to produce glass with refrective index of at least over 2.10 by a method differing from the past of using a very high temperature of over 2,700° C. that greatly exceeds the temperature used for conventional glass industry, and by rapid forced quenching.

However, it goes without saying that the use of such extremely high temperature would pose many difficult technical problems, so such a method should be avoided as much as possible. Moreover, since $TiO_2$ is an ingredient that readily causes devitrification it is deemed that very large $TiO_2$ content should be avoided as practically as possible, providing the aforementioned refractive index of over 2.10 can be obtained.

Consequently, the object of this invention is to produce glass with refractive index of over 2.10, suited for forming minute glass beads of less than 0.1 mm in diameter and for making glass flakes and fibers etc. that can be readily formed by the conventional glass making method, without using the harmful PbO and CdO and the aforementioned $Bi_2O_3$ and thereby obtain a composition for a stable glass that would not devitrify during glass fomation. In order to fulfil the object of this invention, repeated tests and experiments were conducted of various compositions using the conventional method of melting at about 1,400° C. within a crucible and small tank furnace.

From the results of actual tests, it was discovered that essentially colorless and transparent glass having a refractive index of over 2.10 could be produced by said conventional method without using PbO or $Bi_2O_3$ ingredients, essentially from the compositions containing the following ingredients in weight percent; 40.0 to 54.0% of $TiO_2$, 24.0 to 44.0% of BaO, 5.0 to 15.0% of ZnO, 3.0 to 13.0% of $ZrO_2$ as main constituents together with 0.2 to 3.0% of CaO, 0.2 to 3.0% of MgO, 0.2 to 2.0% of $SiO_2$, 0.1 to 0.5% of $Na_2O$ and/or $K_2O$, provided that the total weight percent of said ingredients used within the specified limits would exceed over 98%.

The reasons for the discovery and selection of the foregoing glass compositions are as follows:

$TiO_2$, BaO, ZnO and $ZrO_2$ are all indispensible constituents for producing the desired high refractive index glass of this invention. In fact, if high temperature for melting and rapid forced cooling method is utilized, transparent glass can be obtained by the system consisting of only the 4 ingredients. However, in the case of using the system composed by the 4 ingredients only, crystallinity readily occure during solidification of the melted glass and the glass becomes immediately devitrified, so actually it becomes unsuitable for producing transparent devitrification-free glass. Accordingly, in this invention, besides the addition of CaO, MgO and $SiO_2$, small amounts of constituents, such as; $Na_2O$ and/or $K_2O$ etc. were mixed with the foregoing $TiO_2$ - BaO - ZnO - $ZrO_2$ system. By doing so, fully transparent glass can be obtained even when melting is conducted at a temperature of about 1,400° C., the temperature generally used for glass melting, and by using the common method of cooling at the customary temperature. Moreover, the glass produced from the foregoing composition is very stable as devitirification does not essentially occur during solidification upon cooling nor even during annealling.

Additional detailed explanation of the foregoing ingredients are as follows:

$TiO_2$ is an essential constituent for producing high refractive index glass, and unless its content is at least over 40% by weight, the desired high refractive index glass cannot be obtained, whereas, if the $TiO_2$ content exceeds 54%, melting of the glass becomes more difficult and devitrification sets in more readily, so it becomes unsuitable. When $TiO_2$ content exceeds 50% by weight, the formed glass has a tendency to be slightly colored, but for all practical purposes it is not objectionable. BaO is an ingredient next in importance to $TiO_2$ in obtaining high refractive index in glass. If its content is less than 24% by weight, the glass becomes very difficult to melt and resulting glass has a great tendency to devitrify, so it is deemed unsuitable. Also if its content exceeds 44%, it also becomes unsuitable, as the ingredient tends to greatly corrode the refactory materials used in melting.

ZnO, similar to BaO, is an important constituent next to $TiO_2$ for producing high refractive index glass, and also is a very effective component in this invention for lowering the viscosity of the melted glass. If its content is less than 5% by weight, the glass is not only difficult to melt but also becomes readily devitrified, so it is deemed unsuitable. However, if its content exceeds 15% by weight, it also becomes unsuitable as ZnO shows a great tendency to becomes volatile during melting or the glass.

$ZrO_2$ is also an important ingredient next to $TiO_2$ in producing high refractive index in glass, and furthermore is an effective component for stabilizing the glass of this invention. If its content is less than 3.0% by weight, its effectiveness is not sufficient to produce devitrification-free glass. Also if its content exceeds 13.0% by weight, viscosity of the melted glass becomes high, and therefore becomes unsuitable. Moreover, $ZrO_2$ is a very important component as it greatly increases the chemical resistance of the glass of this invention.

Next, the ingredients, such as; CaO, MgO, $SiO_2$, $Na_2O$, $K_2O$ etc., by using them in relatively small amounts compared to $TiO_2$, BaO, ZnO and $ZrO_2$, as a result of mutual action with the foregoing 4 ingredient system, makes the melting of glass possible by the conventional method at a temperature of about 1,400° C., and also are important components for preventing devitrification.

CaO is effective in preventing devitrification, but if its content is less than 0.2% by weight, its effect is not noticeable, and also if its content is more than 3.0% by weight, there is a tendency for the refractive index to be greatly decreased, so the use of CaO in excess of 3.0% should be avoided.

MgO, within the limits of 0.2 to 3.0% by weight, is used for preventing devitrification. If MgO content is less than 0.2% by weight, its effect on devitrification prevention is insufficient, but if its content exceeds 3.0%, it tends to increase the devitrification instead.

$SiO_2$, within the limits of 0.2 to 2.0% by weight, is used for devitrification prevention. If $SiO_2$ content is less than 0.2% by weight, its effect on devitrification prevention is insufficient, but if its content exceeds 2.0%, refractive index of the glass is greatly reduced, so its use in amounts greater than 2.0% by weight must be avoided.

$Na_2O$ and/or $K_2O$ is effective in devitrification prevention if used within the limits of 0.1 to 0.5% by weight. However, if its content is less than 0.1% by weight, the desired effect cannot be gained. Also, if its content exceeds 0.5% by weight, the refractive index of the glass is greatly reduced, so its use in amounts greater than 0.5% by weight should be avoided.

It is needless to say that the glass of this invention substantially does not contain PbO, $Bi_2O_3$ and CdO etc. when considering the object of this invention.

In the past in these types of glass with high refractive index, there have been many cases where $B_2O_3$ was included in appropriate amounts as shown in U.S. Pat. No. 2,790,723 and in many reference materials. Whereas, the exclusion of $B_2O_3$ as a constituent is also one of the characteristics of this invention. Namely, when glass beads are formed from this type of glass, they are usually annealled to increase the refractive index, however in the case of the glass formed by this invention, the addition of $B_2O_3$ actually hinders the stable increase of the refractive index during annealling, so $B_2O_3$ was excluded from the compositions of this invention.

Table 1 shows the examples of compositions for the glass of this invention.

TABLE NO. 1

| No. | $TiO_2$ | BaO | ZnO | $ZrO_2$ | CaO | MgO | $SiO_2$ | $Na_2O$ | $K_2O$ | | Refractive Index $n_D$ |
|---|---|---|---|---|---|---|---|---|---|---|---|
| 1 | 40.0 | 44.0 | 5.0 | 9.0 | 1.0 | 0.2 | 0.6 | 0.2 | | | 2.10 |
| 2 | 41.3 | 40.2 | 6.0 | 7.0 | 1.5 | 2.3 | 1.5 | 0.2 | | | 2.11 |
| 3 | 42.7 | 36.0 | 14.0 | 5.0 | 0.9 | 0.3 | 0.8 | 0.1 | 0.2 | | 2.12 |
| 4 | 43.7 | 38.1 | 7.0 | 5.2 | 3.0 | 0.5 | 2.0 | | 0.5 | | 2.12 |
| 5 | 44.2 | 37.1 | 6.2 | 8.4 | 0.5 | 3.0 | 0.3 | 0.3 | | | 2.13 |
| 6 | 45.8 | 31.2 | 6.8 | 12.9 | 2.3 | 0.4 | 0.2 | 0.4 | | | 2.14 |
| 7 | 46.9 | 32.0 | 7.5 | 10.9 | 1.0 | 0.3 | 1.2 | 0.2 | | | 2.15 |
| 8 | 47.0 | 31.5 | 5.0 | 11.8 | 2.0 | 1.0 | 1.4 | | 0.3 | | 2.16 |
| 9 | 47.2 | 40.0 | 5.9 | 5.2 | 0.5 | 0.8 | 0.3 | | 0.1 | | 2.13 |
| 10 | 47.4 | 34.0 | 13.0 | 4.0 | 1.0 | 0.2 | 0.2 | 0.2 | | | 2.14 |
| 11 | 47.8 | 42.0 | 5.0 | 3.6 | 0.5 | 0.5 | 0.5 | 0.1 | | | 2.13 |
| 12 | 48.0 | 31.0 | 11.9 | 6.0 | 0.3 | 1.5 | 1.0 | 0.3 | | | 2.16 |
| 13 | 48.5 | 24.8 | 14.9 | 5.2 | 2.1 | 2.5 | 1.7 | 0.2 | 0.1 | | 2.18 |
| 14 | 48.5 | 29.3 | 13.6 | 6.2 | 1.4 | 0.3 | 0.5 | 0.2 | | | 2.16 |
| 15 | 49.0 | 30.0 | 15.0 | 3.0 | 0.2 | 1.0 | 1.5 | | 0.3 | | 2.18 |
| 16 | 49.0 | 32.0 | 9.6 | 4.5 | 2.5 | 0.5 | 1.7 | 0.2 | | | 2.17 |
| 17 | 49.5 | 29.8 | 13.8 | 4.4 | 0.4 | 0.4 | 1.3 | | 0.4 | $Al_2O_3$ | 2.17 |
| 18 | 49.5 | 26.7 | 11.2 | 4.4 | 2.0 | 3.0 | 2.0 | | 0.2 | 1.0 | 2.18 |
| 19 | 49.7 | 37.5 | 6.0 | 5.3 | 0.2 | 0.4 | 0.7 | 0.2 | | SrO | 2.16 |
| 20 | 49.7 | 34.6 | 5.3 | 6.1 | 0.3 | 0.5 | 1.0 | 0.5 | | 2.0 | 2.17 |
| 21 | 49.8 | 25.8 | 12.0 | 7.0 | 3.0 | 0.2 | 2.0 | 0.2 | | | 2.19 |
| 22 | 49.9 | 30.9 | 8.4 | 6.4 | 1.6 | 0.6 | 1.9 | 0.3 | | | 2.18 |
| 23 | 49.9 | 28.2 | 13.2 | 3.0 | 2.5 | 1.7 | 1.3 | 0.2 | | | 2.18 |
| 24 | 50.0 | 34.5 | 8.4 | 4.0 | 1.0 | 0.4 | 1.5 | 0.2 | | | 2.17 |
| 25 | 50.0 | 27.3 | 10.0 | 4.5 | 3.0 | 2.8 | 2.0 | 0.1 | 0.3 | | 2.18 |
| 26 | 50.7 | 33.0 | 8.5 | 4.0 | 1.3 | 1.3 | 0.9 | 0.3 | | | 2.18 |
| 27 | 51.0 | 28.7 | 10.0 | 5.0 | 2.3 | 1.0 | 1.6 | 0.4 | | | 2.18 |
| 28 | 51.6 | 32.8 | 6.3 | 5.5 | 1.1 | 1.1 | 1.4 | | 0.2 | | 2.18 |
| 29 | 51.9 | 29.0 | 9.8 | 4.5 | 2.7 | 1.5 | 0.4 | | 0.2 | | 2.19 |
| 30 | 52.5 | 25.0 | 10.7 | 6.8 | 2.0 | 0.9 | 1.9 | 0.2 | | | 2.20 |
| 31 | 53.5 | 24.0 | 13.0 | 3.5 | 2.4 | 1.9 | 1.3 | | 0.4 | | 2.21 |
| 32 | 53.5 | 34.0 | 5.0 | 3.0 | 1.0 | 2.5 | 0.5 | 0.5 | | | 2.20 |

TABLE NO. 1-continued

| | COMPOSITIONS (WEIGHT %) | | | | | | | | | Refractive Index |
|---|---|---|---|---|---|---|---|---|---|---|
| No. | TiO$_2$ | BaO | ZnO | ZrO$_2$ | CaO | MgO | SiO$_2$ | Na$_2$O | K$_2$O | nD |
| 33 | 54.0 | 28.0 | 9.0 | 3.1 | 2.5 | 2.0 | 0.9 | | 0.5 | 2.21 |

Next is a description of a sample method of producing the glass of this invention and the formation of glass beads from said glass.

Firstly, the batch of raw materials mixed within the aforementioned weight percentage limits is melted within an ordinary small tank furnace, preferably constructed of zirconia type refractory material. The heating temperature is about 1,400° C. Since the melted glass has a low viscosity, its liquidity is high so it readily flows down through small holes located at the bottom of the furnace. In order to make the flowing glass into fine cullets, the glass is made to fall down into flowing water. After the cullets are dried in a dryer, they are further pulverized into very minute particles by a milling machine, sifted by an appropriate method to grade them into different sizes. Then the fine particles by a commonly known method are heated at a temperature between 1,300° C. and 1,400° C. and made into glass beads by surface tension.

In accordance with the necessity as aforementioned, the refractive index of the glass and glass beads of this invention can be stably increased about 2% or more by annealling.

For the raw materials of the glass of this invention, it is desirable to use raw materials that are ordinarily used for optical glass or raw materials that have similar purity. The raw materials normally used are as follows: For TiO$_2$, titanium dioxide is used. For BaO, barium carbonate or barium nitrate is used. For ZnO, zinc white is used. For ZrO$_2$, zirconium oxide is used. For CaO, clacium carbonate is used. For MgO, magnesium hydroxide is used. For SiO$_2$, powdered silica is used. For Na$_2$O, soda ash or sodium nitrate is used. For K$_2$O, potassium nitrate is used.

Even though the glass of this invention has a refractive index of over 2.10 suitable for glass beads used in reflex-reflective sheet, it does not contain harmful ingredients such as, PbO, CdO etc. and also does not contain Bi$_2$O$_3$, so said glass can be readily produced by the conventional method without the various considerations and care that would be required during manufacture, if such constituents were used. In addition, since this glass is stable, transparent glass can be readily produced industrially. Furthermore, the composition of the glass relating to this invention, is not required to be limited only to the component ingredients mentioned in the scope of patent application, but so long as the requirements noted in the scope of patent application is met, the addition of SrO, Al$_2$O$_3$, CeO$_2$ as yellow coloring additive, and small amounts of other metal oxides, as matter of course, are included within the purview of this application.

I claim:

1. A glass composition having a refractive index of over 2.10 composed of the following metal oxides in weight percent; 40.0 to 54.0% of TiO$_2$, 24.0 to 44.0% of BaO, 5.0 to 15.0% of ZnO, 3.0 to 13.0% of ZrO$_2$, 0.2 to 3.0% of CaO, 0.2 to 3.0% of MgO, 0.2 to 2.0% of SiO$_2$, 0.1 to 0.5% of Na$_2$O and/or K$_2$O, and whose total weight exceeds 98.0% and moreover essentially without containing B$_2$O$_3$.

* * * * *